United States Patent [19]

Marshall

[11] Patent Number: 5,027,350
[45] Date of Patent: Jun. 25, 1991

[54] METHOD AND APPARATUS FOR PROVIDING A LOCAL AREA NETWORK BRIDGE

[75] Inventor: Alan D. Marshall, Merchants Landing, United Kingdom

[73] Assignee: Hewlett-Packard, Palo Alto, Calif.

[21] Appl. No.: 423,954

[22] Filed: Oct. 18, 1989

[30] Foreign Application Priority Data

Oct. 20, 1988 [EP] European Pat. Off. ............ 88309860

[51] Int. Cl.$^5$ ............................................. H04J 3/24
[52] U.S. Cl. ................................ 370/85.13; 370/94.1; 340/825.52
[58] Field of Search ................. 370/85.13, 85.14, 85.1, 370/85.2, 85.6, 94.1, 60, 61; 340/825.02, 825.5, 825.51, 825.52

[56] References Cited

U.S. PATENT DOCUMENTS

| | | | |
|---|---|---|---|
| 4,577,313 | 3/1986 | Sy | 370/85.14 |
| 4,597,078 | 6/1986 | Kempf | 370/94 |
| 4,707,827 | 11/1987 | Bione et al. | 370/85.13 |
| 4,715,030 | 12/1987 | Koch et al. | 370/85.13 |
| 4,897,841 | 1/1990 | Gang, Jr. | 370/85.13 |

FOREIGN PATENT DOCUMENTS 0269978  8/1988  European Pat. Off. .

OTHER PUBLICATIONS

"Transparent Interconnection of Local Area Networks with Bridges", J. of Telecomm. Networks, vol. 3, pp. 116-130, 1984.
"The Design and Implementation of a Transparent MAN/LAN Gateway", DeGrandi, European Fiber Optical Communications and Local Area Networks Exposition, pp. 146-151, 1986.
"Transparent Interconnects of Broadcast Networks", Sincoskre, International Zurich Seminar on Digital Communications, 1986.
Proceedings Compcon 84 Fall, Arlington, Va., 16th-20th Sep. 1984, pp. 333-340, IEEE, N.Y.; F. Akashi et al.: "Efficient Local Area Network Interconnection Using a Bridge", pp. 335-336.
Proceedings 12th Conference on Local Computer Networks, Minnesota, 5th-7th Oct., 1987, pp. 130-135, IEEE, N.Y.; Y. Ohteru: "Interconnecting IEEE 802 Lans by a Wideband Backbone Network", Paragraphs 2,4.
IEE Proceedings-E/Computers and Digital Techniques, vol. 135, No. 1, Part E, Jan. 1988, pp. 55-59, Stevenage, Herts., GB; P. Wolstenholme: "Filtering of Network Addresses in Real Time by Sequential Decoding".

Primary Examiner—Douglas W. Olms
Assistant Examiner—Alpus H. Hsu
Attorney, Agent, or Firm—Woodcock, Washburn, Kurtz, Mackiewicz & Norris

[57] ABSTRACT

A communication bridge interconnecting two or more local area networks. Input buffers forward packet headers of received data packets through to a routing engine. The routing engine contains one or more routing tables each having a plurality of table locations containing table data in the form of station addresses and routing data. The table is accessed by applying a hashing algorithm to a received destination address contained in the data packet to determine the table location and then checking that the station address retrieved from the table location corresponds with the destination address in the received data packet.

13 Claims, 4 Drawing Sheets

METHOD AND APPARATUS FOR PROVIDING A LOCAL AREA NETWORK BRIDGE

BACKGROUND OF THE INVENTION

This invention relates to a method and apparatus for providing a communication bridge interconnecting two or more local area networks.

Local area networks (LANS) enable local communication among computing stations and computer related devices. As a LAN installation grows, bridges are employed to interconnect LANS so as to allow stations connected to different LANS to communicate as if both stations were on the same LAN. Thus, a bridge is an N port device, where N is equal to or greater than 2. Considerable work has been expended on so-called transparent interconnection of LANS with bridges. For example, the paper "Transparent Interconnection of Local Area Networks with Bridges" (J. Telecomm Networks Vol. 3, pp. 116-130, Summer 1984) discloses a bridge wherein each bridge independently constructs and maintains its own routing database. The routing database contains one entry for each station address the bridge knows together with appropriate routing data. Each entry also contains an age field or time stamp. When the time stamp is too old the entry is deleted, obsolete entries are reduced. Forwarding a data packet (frame) received by a bridge from a LAN requires looking up the destination in the routing data base of the bridge. If the bridge finds the destination address, it employs the routing data to forward the data packet to the indicated address unless that LAN was the source for the data packet. If the destination is not found, the data packet is broadcast on or forwarded to all the LAN connections with the bridge except the one on which it was received. Whenever the forwarding process uses a database entry it resets the particular time stamp.

It is known to employ hashing techniques in such arrangements. A hash table comprises applying an algorithm to data in order to define the table location or position of the hash table into which selected data is written. To retrieve the data, the hash algorithm is applied to the search item. As is known, applying a hash algorithm can produce an event termed "a collision" wherein items hash to the same location in the table, these are called synonyms. In the event of a collision, the synonym is placed elsewhere. This is achieved by secondary probing in which a series of table locations are searched until an empty one is found. Similarly, on retrieval, a process of secondary probing is employed to access the table location in the event that the first location contains an entry for a different address. One known arrangement which employs hashing is described in an article entitled "The Design and Implementation of a Transparent MAN/LAN Gateway", by De Grandi, G.; Garrett, M. W.; Albanese, A.; Lee, T. H. CEC JRC, Ispra, Italy; Editors Fasano, D.; Kennelly, C.; Polishuk, P., EFOC/LAN 86 Proceedings. Papers presented at: The Fourth Annual European Fibre Optical Communications and Local Area Networks Exposition 146-51 1986, 27-27 June 1986, Amsterdam, Netherlands, Publ: Inf. Gatekeepers, Boston, Mass., USA. In this arrangement a data packet has destination and source addresses and is filtered by hashing a 48 bit address field into 14 bits and pointing into table of 16, 384 entries, each of 1 bit. This table contains a "1" for each host belonging to the local population. The table is updated according to the information in the source address field of the packets coming into the bridge from the local LAN. These packets are processed in that the source address is hashed and the results placed in an interprocessor communication port. This port is then read to set the appropriate bite in the 16 kilobit table.

As technology has progressed, it has been possible to increase the speed of the LANS and still employ the aforementioned bridges. As this speed increases, each accessing of the routing data for the processing of each data packet needs to take place within a shorter and shorter predetermined bounded frame time. However, the aforementioned bridges have a time limit within which to process a data packet. For example, it has been found that with bridges employing hash algorithms, when collisions in the hash table occur and secondary probing must be employed, it is difficult to finish the processing of a data packet within the frame time. A possible solution to this problem is to employ content addressable memories. Such memories are discussed in the article "Transparent Interconnections of Broadcast Networks" by W. D. Sincoskie (1986 International Zurich Seminar on Digital Communications). In this document, there is disclosed a drop filter which can insert a source address and look up a destination address in the minimum packet interarrival time. As stated therein, the fastest content addressable memory is one in which each memory cell in the drop filter incorporates an exclusive-OR gate. A scheme is recommended where the entries in the drop set are timed and entries which have not been reinforced by another packet from the host in a certain maximum time T are dropped. Unfortunately, content addressable memories are a specialized item and are complicated. Consequently, they are expensive. Furthermore, estimates need to be made of the number of locations needed in a CAM when a LAN network is being constructed. Thus, there can come a time when it is necessary to delete some addresses in the CAM as it becomes overloaded. Finally, another problem which also applies to the aforementioned bridges, is that although the techniques apply easily to the interconnection of two local area networks, it is difficult to generalize the process parameters to connecting three or more local area networks.

SUMMARY OF THE INVENTION

It is an object of the present invention to provide a method and apparatus for providing a communication bridge to route data packets between two or more local area networks or the like which substantially overcomes the aforementioned problems.

It is a more specific object of the invention to provide such a method and apparatus wherein data packets can be processed very quickly compared with the hitherto known methods.

It is a further specific object of the invention to provide a method and apparatus wherein the collisions which do occur result in only some unnecessary broadcast traffic, and this can be reduced as much as required but only at the cost of hardware replication.

It is a further object of the invention to provide a method and apparatus which ensures that data packets are transferred and degradation is seen as an increasing number of packets which are spuriously transferred across the bridge.

It is another object of the invention to provide a method and apparatus which does not require large content addressable memories to be built but instead relies on stock memory parts and modest custom hashing integrated circuits. It is yet another object of the invention to provide a method and apparatus which can be generalized effectively to interconnection of more than two local area networks or to the interconnection of two or more stations within a single local area network.

In accordance with this invention, a communication bridge routes data packets containing a source address, a destination address and routing data wherein the bridge interconnects two or more local area networks or the like having stations on the network, each station having a unique address.

In further accordance with this invention, table data is stored at table locations of a routing table, the table data comprising station addresses together with the respective routing data.

In further accordance with the invention, data packets are received from the network and a hashing algorithm is applied to the destination address of a data packet when received and on the basis thereof, a table location is accessed to retrieve routing data and the station address therefrom.

In still further accordance with the invention, after one or a predefined limited number of hash probes, the data packet is forwarded onto all networks other than the one from which the packet was received if the accessed table location is empty or does not contain a station address corresponding to said data packet destination address, or in the event that the addresses correspond, forwarding the data packet according to the retrieved routing data without further hash probes.

In one form of the invention, only one hash probe is used. By allowing only a limited number of hash probes which number can be one, it is possible to ensure that the processing time of a received data package will fall within the predetermined bounded frame time.

In a preferred embodiment of the invention, the storing of table data includes overwriting table locations with table data derived from a received data packet, the table location being selected by applying the hashing algorithm to the source address of the data packet when received. If the table location is empty or the source address of the received packet corresponds to the existing station address in the table location, a station address is entered together with routing information into the table location, where the station address entered is the source address of the received packet, or if the source address of the received packet does not correspond to the station address of the table location, a station address together with routing information is entered into a table location after the predefined number of hash probes, the station address being the source address of the received packet. Thus, an updating method can be provided wherein addresses of stations on a local area network are learned.

In embodiments of the present invention, each packet sent across a network may have two addresses, a source address indicative of the station sending the packet and a destination address indicative of the station to which the packet is to be sent. The bridge which interconnects the network includes a routing table which is built-up by looking at the source address of the packets to form a plurality of station addresses, each of which has associated routing data. The bridge operates to route each packet according to its destination address. When the bridge sees a packet on any of the networks to which it is connected it compares the destination address in the packet with the station address at a table location and routes the packet accordingly. The bridge then uses the source address in the packet as the station address in a new routing table entry. The route in the new table entry indicates on which network the packet arrived.

Preferably, a plurality of routing tables are used wherein a plurality of routing tables are connected in parallel and a plurality of hashing means are used, each connected to a respective routing table for employing an independent hashing algorithm to retrieve table data. By employing a plurality of tables with independent hash algorithms, it is possible to reduce the probability of table collisions. Thus, this embodiment expands the applications of the bridge of the present invention and also improves the performance thereof.

Preferably, each table location includes a time stamp and the routing means is also operative to forward the data packets on to the local area network if the date stamp of a retrieved table location is at least a predetermined time ago. Thus, the time stamp with the present invention is an indication of how recently the table data was provided and thus how reliable the information is.

In further accordance with the present invention, a local area network is provided, the local area network comprising at least two stations each having a unique address; a routing or hashing table containing station addresses together with routing data; hashing means for applying a hashing algorithm to a destination address of a received data packet and accessing a table location on the basis thereof to retrieve the routing data therefrom; and routing means for routing the received data from a source station to a destination station.

BRIEF DESCRIPTION OF THE DRAWINGS

Examples of the present invention will now be described with reference to the accompanying drawings, in which.

DETAILED DESCRIPTION OF THE PREFERRED EMBODIMENT

Figure 1:
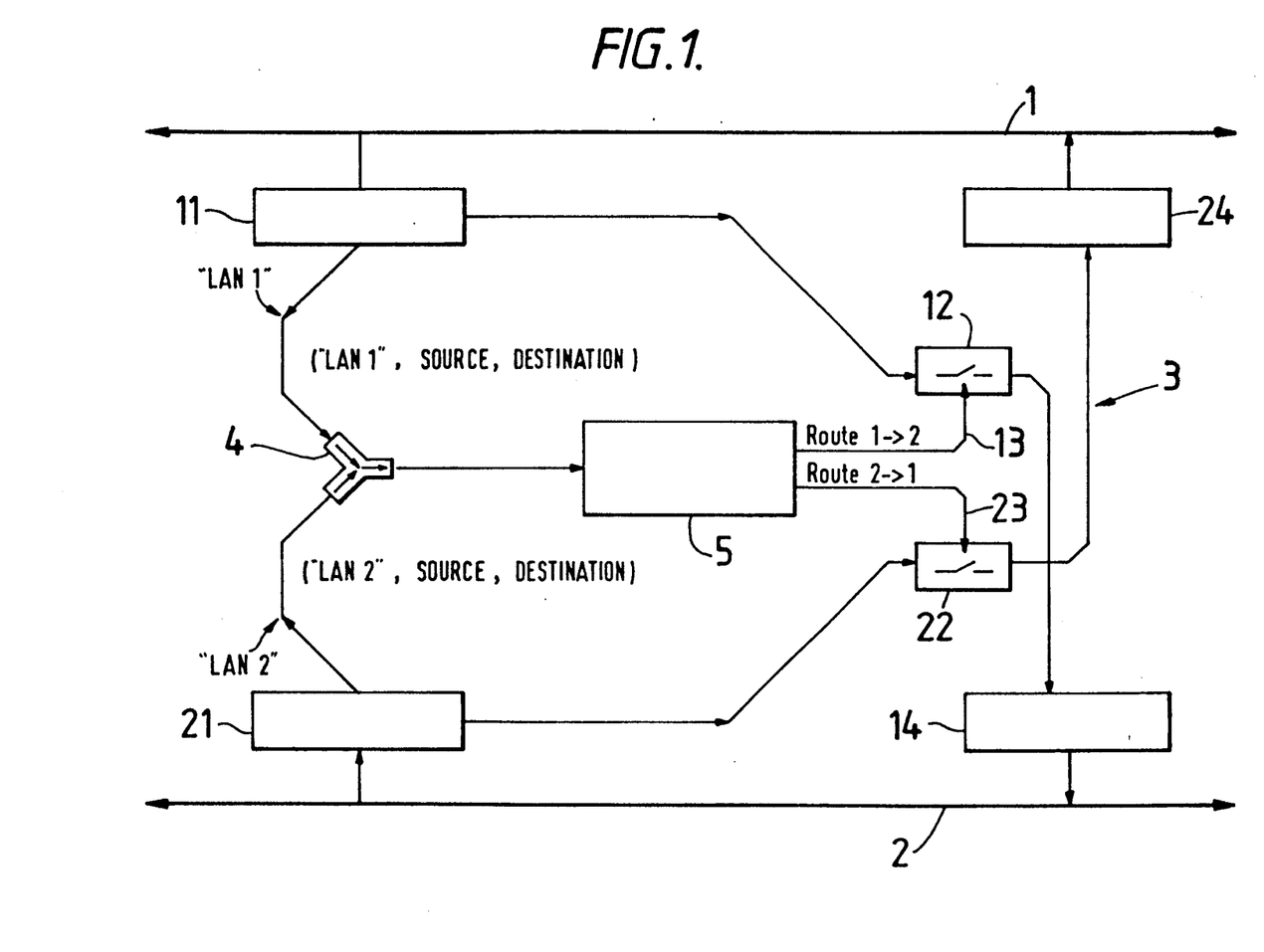
FIG. 1 in schematic form illustrates a first embodiment of the present invention.

Referring to FIG. 1, a local area network (LAN) 1 is connected to another local area network 2 by means of a bridge generally designated by the numeral 3. The bridge functions to route the flow of data packets between the LANs 1 and 2. The bridge 3 has input buffers 11 and 21 connected to local area networks 1 and 2 respectively. Each input buffer sends the whole of a received packet to a routing switch 12 and 22 respectively while at the same time, the so-called packet header of each received data packet, which contains an identification of the local area network, a source address and destination address, is forwarded to an arbitration logic control 4.

Figure 2:
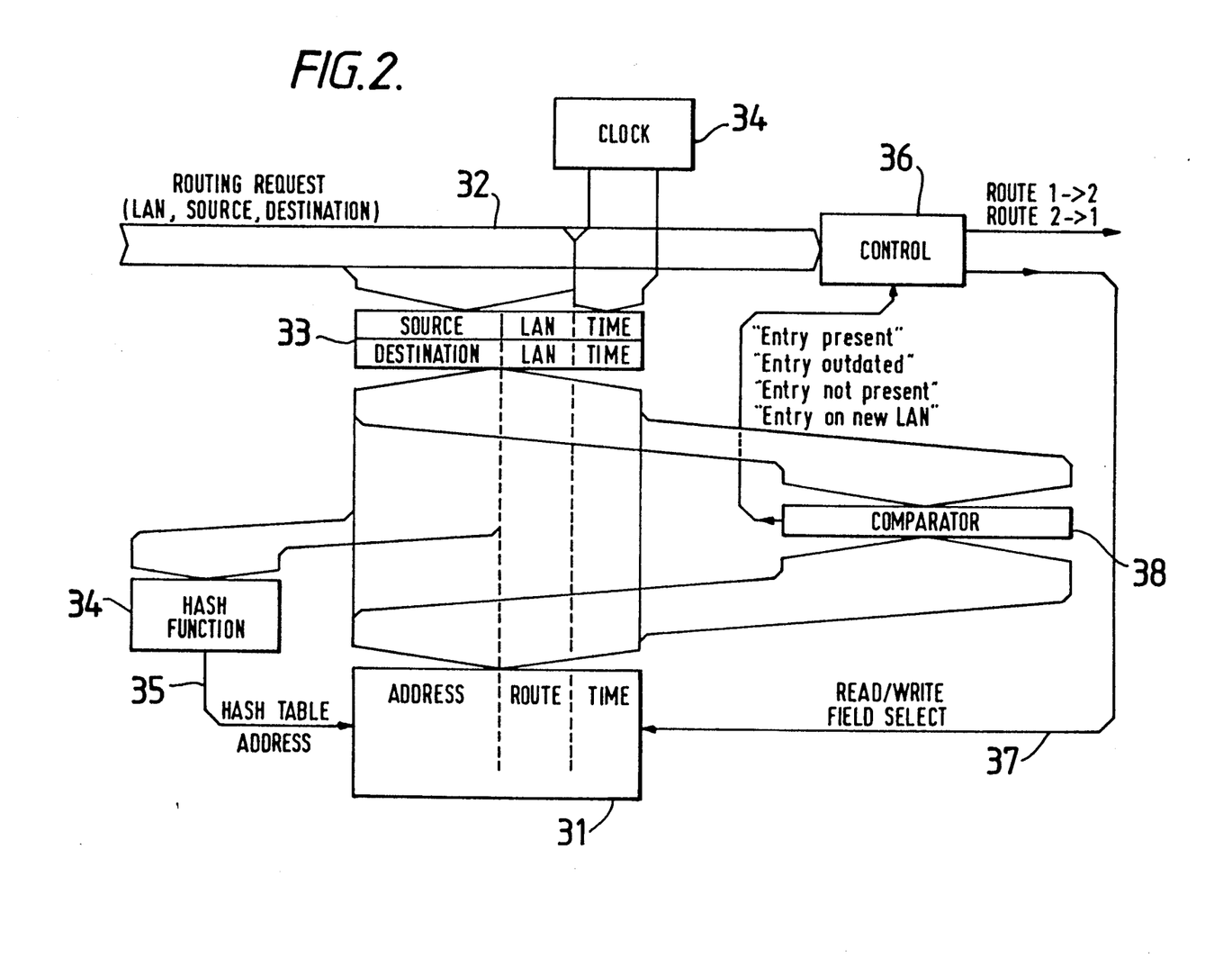
FIG. 2 illustrates control functions of the routing engine shown in FIG. 1.
Figure 3:
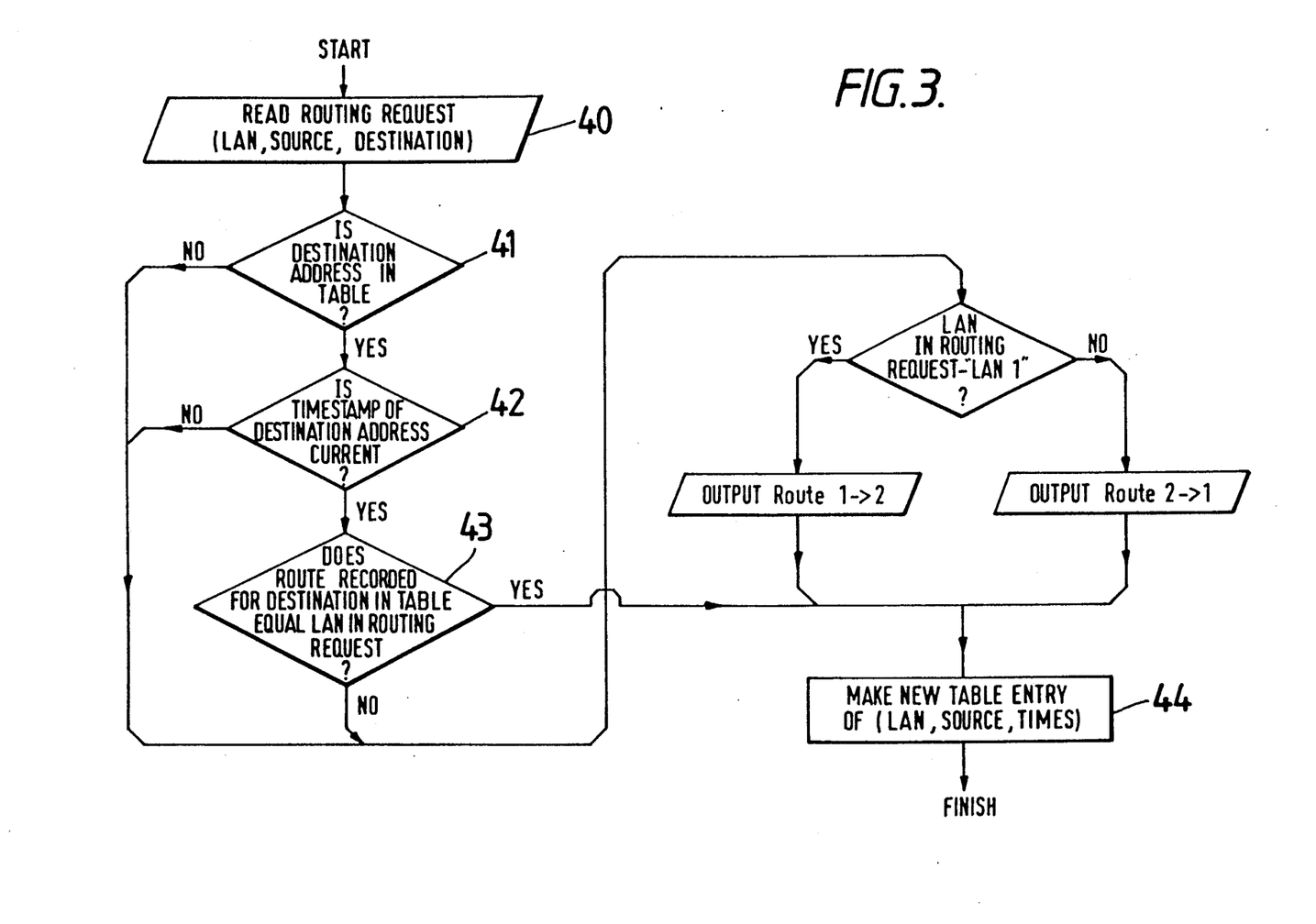
FIG. 3 illustrates a flow diagram for operation of the routing engine.

The logic control 4 dictates when the packet header is forwarded through to a routing engine 5 which decides whether to actuate a control line 13 or 23 connected respectively to the control switches 12 and 22. In the event that the signal is given on line 13, the whole packet from buffer 11 passes through the switch 12 to an output buffer 14 connected to the local area network 2. In the event that the signal is present on the line 23, then the signal from the input buffer 21 passes through the switch 22 to an output buffer 24 connected to local area network 1. Thus it can be seen that the routing engine 5 decides whether received data packets, either on input buffer 11 or 21, are forwarded to the "other" local area network to which the bridge is connected. Referring to FIGS. 2 and 3, the routing engine 5 has a routing table 31. The packet header received from the arbitration logic control 4 is observed on a bus 32 in order to determine the source address, the destination address and the local area network as shown in time stamped frame data table 33 and step 40 in FIG. 3. It will be apparent that a clock 34 applies a time stamp to the source and destination information. The data in time stamped frame data table 33 is then forwarded to a hashing means 34 which applies a hash algorithm to the destination address.

The resultant signal on line 35 decides upon the table location which will be accessed to retrieve table data therefrom. A control unit 36 having detected receipt of a data packet provides a signal on line 37 to the table to ensure that the table status is for reading. The contents at the particular table location are relayed to a comparator 38 which then carries out the steps 41, 42 and 43 shown in FIG. 3. Essentially, the comparator 38 firstly establishes whether the table location contains any data, secondly whether the data time stamp has timed out, and thirdly whether the route data equals the local area network from which the data packet has arrived. It can be seen that the step 41 also effectively establishes that the station address contained at a particular table location matches the destination of the address which has been relayed from the box 33.

According to the result of the steps 41, 42 and 43, the control 36 issues an appropriate signal on lines 13 and/or 23 to transfer the data packet from input buffer 11 or 21 to the respective output buffers 14 and/or 24.

In the event that the table location holds an address different from the current address in time stamped frame data table 33, then a hash table collision has occurred. As it is not apparent whether the destination address should be in the routing table 31 or not, the comparator 38 forwards a signal to control 36 which implements a protocol that the data packet is forwarded to all connected LANS. If the routing table has H times as many locations as addresses that have been used in the aforementioned time out period, then the collision situation should occur on only about 1/H occasions. The situation is only likely to be a problem when two or more live addresses are competing for the same location.

As can be seen from FIG. 3, a final step 44 is incorporated wherein the source address and routing data contained in time stamped frame data table 33 is forwarded to the hashing means 34 which applies the hashing algorithm to the source address to define the table location in the table 31 into which the source address, routing data and time stamp are inserted. It should be noted that although the source address is written into the table, it is considered a destination address when retrieved as table data. The table should have several times (H) as many table locations as the number of addresses the bridge is expected to hold. Furthermore, it is preferable that there is an even spread of data entries in the table. It will be apparent that for step 44 to occur, the control unit 36 places an appropriate signal on line 37 to put the table 31 into the write mode.

In summary, the table 31 stores source addresses and routing information and a time stamp at a table location which is defined by a hashing algorithm applied to the source address. Thus, the time stamp in a table location is only up dated when over written on receipt of the same source address. Consequently, the time stamp in the present embodiment is an indication of how recently the address and route information at the table location was provided and thus how reliable the information is.

The embodiment described above is arranged to forward a data packet after a single hash probe. It should be appreciated that arrangements in accordance with the invention are contemplated where more than one (up to a predefined limited number) hash probe is possible provided processing time-permits. Such arrangements do not constitute full secondary probing.

Figure 4:
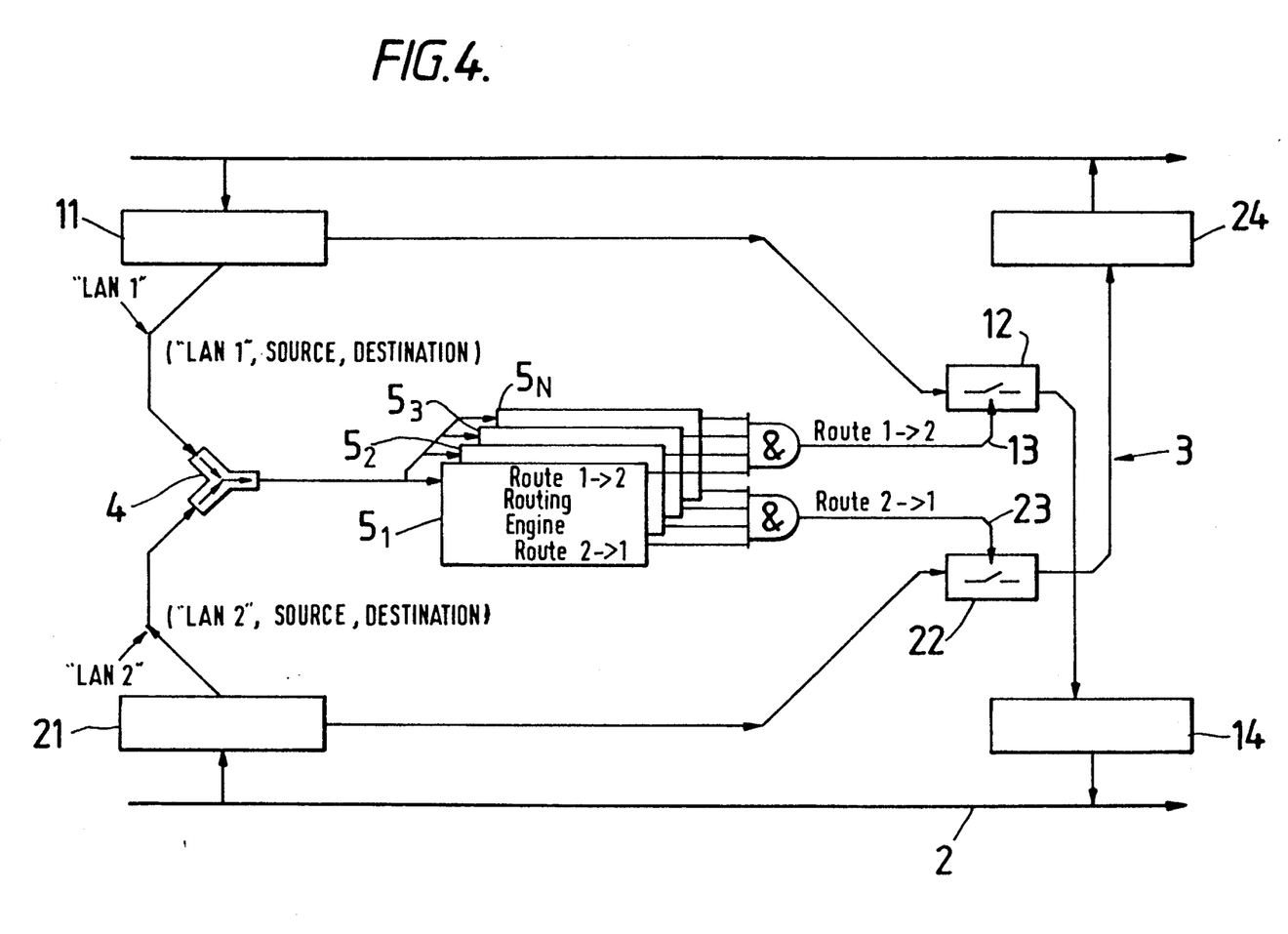
FIG. 4 illustrates another embodiment of the present invention in schematic form.

The embodiment described with reference to FIGS. 1 to 3 incorporates a single routing table 31 within the routing engine 5. However, as shown in FIG. 4, a plurality of parallel connected routing engines can be employed. Components common to FIGS. 4 and 1 bear the same reference numerals. Generalizing FIG. 4, there are N parallel tables with independent hashing algorithms defining table locations within a respective routing table. Thus, table data is written into all the tables in parallel but with table locations defined by the respective hashing algorithm. Thus, it is only necessary for an address to be searched for until it is found in just one of the tables. Consequently, whereas the collision problem mentioned above may occur in about 1/H occasions, in the present embodiment then such a situation should only arise in $1/H^N$ occasions as opposed to $1/H.N$ if a single table of HN entries was formed.

To clarify the above, consider some sample numbers:

| | |
|---|---|
| Number of addresses to be held | 1024 |
| Length of address | 48 bits |
| Length of routing | 0 bits for a half bridge information between 2 LANs - if the destination address is found the packet is not copied over the bridge |
| Length of timestamp | 16 bits |
| H (locations per table/1024) | 32 |
| N (number of tables) | 2 |
| Memory devices used | 32k = 8 bits |
| Then there are the following characteristics of the apparatus: | |
| Memory used | 16 devices × 512k bytes |
| Fraction of addresses with contention problems | 1/(32**2) × 1/1024 |

If the time stamp is incremented every second, then time statement values would be used every 18 hours approximately. Consequently, a background process to remove all out dated entries before their time stamp values are reused would be needed, otherwise old entries would be reincarnated and could cause packets to be dropped erroneously. Of course, although the time stamp is a preferred feature, it is not essential.

The present invention has a number of advantages over the use of content addressable memories The present invention would degrade slowly as the number of addresses increases, with degradation being seen as an increasing number of packets which are spuriously communicated across the bridge. The absolute maximum addresses capacity will be many times the target address capacity for a realistic implementation. Finally, the present invention does not require large content addressable memories to be built and can instead rely on stock memory parts and modest custom hashing, integrated circuits.

The present invention is not limited to providing a communication bridge between local area networks. An alternative embodiment of the invention provides a method of operating a dual bus communication or local area network wherein all communicating stations are connected together by two unidirectional busses. If a station A is to communicate with another station B, it must send its data on the bus that carries traffic in the direction from A to B. Station A could also transmit the data on both busses to be sure of reaching station B. However, this would waste half of the communication capacity of the network. A more efficient approach would be to employ the routing engine described above. According to the invention, the routing table would preferably be constructed automatically by dedicated circuitry, when the network is powered up. Most preferably, each station maintains a list of stations on the network. Each station also records the bus to be used in transmitting to that station. These functions are carried out by the Media Access Control (MAC) layer of the protocol stack.

The list of stations is indexed with the address of the destination station, which could contain up to 60 bits for an E. 164 format address. The table returns a found/not found indication, and a single bit indicating which of two busses is to be used. If a station is not found in the table, both busses are used.

The following characteristics make the single probe hashing method most preferable:
1. The hardware is cheap. As it needs to appear in every station on the network, a Content Addressable Memory might not be an attractive solution.
2. The address space of up to 60 bits is sparsely populated. It is unlikely that a station would have to record data for more than 1000 stations.
3. It is not important that every entry in the table is found, as the penalty for "lost entries" is some spurious transmission which in this case is limited to the local network only. The loss of 1 entry in 64 might be quite acceptable for instance.
4. The table search has to occur in a bounded time, but it is not clear that this time is excessively short. So it is preferable to use up to a fixed number of probes into a single table rather than have several parallel tables. Deletion of entries from such a table could cause existing entries to be "lost", but they would be re-incarnated when the station concerned was next used. The average performance would not be affected much.

Although preferred embodiments of the invention have been described, various modifications will occur to those of ordinary skill in the art which will fall within the true spirit and scope of the invention as set forth in the appended claims.

I claim:

1. A method for using a communication bridge to route data packets containing source address, destination address and routing data, the bridge interconnecting two or more local area networks or the like wherein the stations on the networks have respective unique addresses, the method comprising the following steps:
   storing table data at table locations of a routing table, the table data comprising station addresses together with the respective routing data;
   receiving data packets from said networks;
   applying a hashing algorithm to the destination address of a data packet when received and on the basis thereof accessing one of said table locations to retrieve routing data and the station address therefrom; and
   after a predefined limited number of hash probes, forwarding the data packet onto all networks other than the one from which the packet was received if the accessed table location is empty or does not contain a station address corresponding to said data packet destination address, or in the event that the addresses correspond, forwarding the data packet according to the retrieved routing data without further hash probes.

2. A method as claimed in claim 1, wherein said limited number is one.

3. A method as claimed in claim 1 or claim 2 wherein the step of storing said table data includes the step of overwriting table locations with data derived from a received data packet, the table location being selected by applying said hashing algorithm to the destination of the data packet when received, and if the table location is empty or the source address of the received packet corresponds to the existing station address in the table location, entering a station address together with routing information into said table location, said station address being the source address of the received packet, or if the source address of the received packet does not correspond to the station address of the table location, entering a station address together with routing information into a table location after said predefined number of hash probes, said station address being the source address of the received packet.

4. Apparatus for providing a communication bridge to route data packets containing a source address and a destination address, the bridge interconnecting two or more local area networks or the like wherein stations on said networks have respective unique addresses, the apparatus comprising:
   a routing table for storing table data at table locations thereof, the table data comprising station addresses together with the respective routing data;
   hashing means for applying a hashing algorithm to the destination address of a received data packet and accessing a said table location on the basis thereof to retrieve the routing data and said station address therefrom; and
   routing means operative, after a predefined limited number of hash probes, for forwarding the data packet onto all said networks other than the one from which the packet was received if the accessed table location is empty or does not contain a station address corresponding to the destination address of the received data packet, or, in the event that the addresses correspond forwarding the data packet according to the retrieved routing data.

5. Apparatus as claimed in claim 4 wherein said limited number is one.

6. Apparatus as claimed in claim 4 or claim 5 comprising a plurality of routing tables connected in parallel and a plurality of hashing means each connected to said respective routing tables for employing a plurality of independent hashing algorithms to retrieve table data.

7. Apparatus as claimed in claim 6 wherein each of said routing tables has a respective means operative for applying the table hashing algorithm to the destination address of a received data packet and, on the basis thereof, if the table location is empty or the source address of the received packet corresponds to the existing station address in the selected location, entering a station address together with routing information into said table location, said station address being the source address of the received packet, or if the source address of the received packet does not correspond to the station address of the selected table location, entering a station address together with routing information into a table location after said predefined number of hash probes, said station address being the source address of the received data packet.

8. Apparatus as claimed in claim 7 wherein each written table location includes a time stamp and said routing means is also operative for forwarding the data packet onto said network if the time stamp of a retrieved table location is at least a predetermined time ago.

9. Apparatus as claim in claim 4 wherein the routing table has a means operative for applying the table hashing algorithm to the destination address of a received data packet and, on the basis thereof, if the table location is empty or the source address of the received packet corresponds to the existing station address in the selected location, entering a station address together with routing information into said table location, said station address being the source address of the received packet, or if the source address of the received packet does not correspond to the station address of the selected table location, entering a station address together with routing information into a table location after said predefined number of hash probes, said station address being the source address of the received data packet.

10. Apparatus as claimed in claim 9 wherein each written table location includes a time stamp and said routing means is also operative for forwarding the data packet onto said network if the time stamp of a retrieved table location is at least a predetermined time ago.

11. A method of operating a communication network, said network comprising at least two stations connected together by at least one data bus; said method comprising:

storing table data at table locations of a routing table, the table data comprising station addresses together with respective routing data;

receiving a data packet from a station, the data packet comprising source and destination addresses;

applying a hashing algorithm to the destination address of said data packet when received, and on the basis thereof accessing one of said table locations to retrieve routing data and a station address therefrom; and after a predefined number of hash probes, forwarding the data onto all buses if the accessed table location is empty or does not contain a station address corresponding to said data packet destination address, or in the event that the addresses correspond, forwarding the data packet according to the retrieved routing data without further hash probes.

12. A communication network comprising:

at least two stations each having a unique address;

a routing table for storing table data at table locations thereof, the table data comprising station addresses together with routing data;

hashing means for applying a hashing algorithm to a destination address of a received data packet and accessing a table location on the basis thereof to retrieve the routing data and said station addresses therefrom; and routing means for routing said received data from a source station to a destination station within a predefined limited number of hash probes.

13. A method of transmitting data from a source station to a destination station of a communication network, said data comprising a source address and a destination address, said method comprising:

reading data sent from the source station;

computing a table location, based upon a predefined hashing algorithm, for determining the location of routing data, wherein said routing data has been previously stored in said table and provides information for routing said data from the source station to the destination station;

transmitting the data to the destination station within a predefined limited number of hash probes.

* * * * *

UNITED STATES PATENT AND TRADEMARK OFFICE
CERTIFICATE OF CORRECTION

PATENT NO. : 5,027,350

DATED : June 25, 1991

INVENTOR(S) : Alan David Marshall

It is certified that error appears in the above-identified patent and that said Letters Patent is hereby corrected as shown below:

Col. 6, line 62, after "memories" insert a period --.--.

Col. 8, line 7, after "after" insert --one or--.

Col. 8, line 50, after "probes" delete "for forwarding" and insert --to forward--.

Signed and Sealed this

Fourth Day of May, 1993

Attest:

MICHAEL K. KIRK

Attesting Officer

Acting Commissioner of Patents and Trademarks